United States Patent
Boyd et al.

(10) Patent No.: US 7,831,759 B2
(45) Date of Patent: Nov. 9, 2010

(54) METHOD, APPARATUS, AND COMPUTER PROGRAM PRODUCT FOR ROUTING PACKETS UTILIZING A UNIQUE IDENTIFIER, INCLUDED WITHIN A STANDARD ADDRESS, THAT IDENTIFIES THE DESTINATION HOST COMPUTER SYSTEM

(75) Inventors: William T. Boyd, Poughkeepsie, NY (US); Douglas M. Freimuth, New York, NY (US); William G. Holland, Cary, NC (US); Steven W. Hunter, Raleigh, NC (US); Renato J. Recio, Austin, TX (US); Steven M. Thurber, Austin, TX (US); Madeline Vega, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 362 days.

(21) Appl. No.: 12/113,793

(22) Filed: May 1, 2008

(65) Prior Publication Data
US 2008/0235785 A1    Sep. 25, 2008

Related U.S. Application Data

(63) Continuation of application No. 11/348,903, filed on Feb. 7, 2006, now Pat. No. 7,380,046.

(51) Int. Cl.
*G06F 13/00* (2006.01)
(52) U.S. Cl. ................................ 710/316; 370/389
(58) Field of Classification Search ......... 710/316–317; 370/389
See application file for complete search history.

(56) References Cited

U.S. PATENT DOCUMENTS

| | | | |
|---|---|---|---|
| 5,257,353 A | 10/1993 | Blanck et al. |
| 5,367,695 A | 11/1994 | Narad et al. |
| 5,392,328 A | 2/1995 | Schmidt et al. |
| 5,960,213 A | 9/1999 | Wilson |
| 5,968,189 A | 10/1999 | Desnoyers et al. |
| 6,061,753 A | 5/2000 | Ericson |
| 6,662,251 B2 | 12/2003 | Brock et al. |

(Continued)

FOREIGN PATENT DOCUMENTS

WO    2006089914 A1    8/2006

OTHER PUBLICATIONS

U.S. Appl. No. 11/567,411, filed Dec. 6, 2006, Boyd et al.
U.S. Appl. No. 11/567,425, filed Dec. 6, 2006, Boyd et al.

*Primary Examiner*—Clifford H Knoll
(74) *Attorney, Agent, or Firm*—Yee & Associates, P.C.; Libby Z. Toub

(57) ABSTRACT

A computer-implemented method, apparatus, and computer program product are disclosed in a data processing environment that includes host computer systems that are coupled to adapters utilizing a switched fabric for routing packets between the host computer systems and the adapters. A unique destination identifier is assigned to one of the host computer systems. A portion of a standard format packet destination address is selected. Within a particular packet, the portion is set equal to the unique identifier that is assigned to the host computer system. The particular packet is then routed through the fabric to the host computer system using the unique destination identifier.

12 Claims, 6 Drawing Sheets

U.S. PATENT DOCUMENTS

| | | |
|---|---|---|
| 6,691,184 B2 | 2/2004 | Odenwald et al. |
| 6,769,021 B1 | 7/2004 | Bradley |
| 6,775,750 B2 | 8/2004 | Krueger |
| 6,813,653 B2 | 11/2004 | Avery |
| 6,907,510 B2 | 6/2005 | Bennett et al. |
| 7,036,122 B2 | 4/2006 | Bennett et al. |
| 7,096,305 B2 | 8/2006 | Moll |
| 7,103,064 B2 | 9/2006 | Petty et al. |
| 7,134,052 B2 | 11/2006 | Bailey et al. |
| 7,174,413 B2 | 2/2007 | Pettey et al. |
| 7,188,209 B2 | 3/2007 | Pettey et al. |
| 7,194,538 B1 | 3/2007 | Rabe et al. |
| 7,350,029 B2 | 3/2008 | Fluhr et al. |
| 7,363,389 B2 | 4/2008 | Collins et al. |
| 7,363,404 B2 | 4/2008 | Boyd et al. |
| 7,398,337 B2 | 7/2008 | Arndt et al. |
| 2002/0144001 A1 | 10/2002 | Collins et al. |
| 2002/0161937 A1 | 10/2002 | Odenwald et al. |
| 2002/0188701 A1 | 12/2002 | Brown et al. |
| 2003/0221030 A1 | 11/2003 | Pontius et al. |
| 2004/0015622 A1 | 1/2004 | Avery |
| 2004/0025166 A1 | 2/2004 | Adlung et al. |
| 2004/0039986 A1 | 2/2004 | Solomon et al. |
| 2004/0123014 A1 | 6/2004 | Schaefer et al. |
| 2004/0172494 A1 | 9/2004 | Pettey et al. |
| 2004/0179534 A1 | 9/2004 | Pettey et al. |
| 2004/0210754 A1 | 10/2004 | Barron et al. |
| 2004/0230709 A1 | 11/2004 | Moll |
| 2004/0230735 A1 | 11/2004 | Moll |
| 2005/0025119 A1 | 2/2005 | Pettey et al. |
| 2005/0044301 A1 | 2/2005 | Vasilevsky et al. |
| 2005/0102682 A1 | 5/2005 | Shah et al. |
| 2005/0147117 A1 | 7/2005 | Pettey et al. |
| 2005/0188116 A1 | 8/2005 | Brown et al. |
| 2005/0228531 A1 | 10/2005 | Genovker et al. |
| 2005/0270988 A1 | 12/2005 | DeHaemer |
| 2006/0168361 A1 | 7/2006 | Brown et al. |
| 2006/0174094 A1 | 8/2006 | Lloyd et al. |
| 2006/0179195 A1 | 8/2006 | Sharma et al. |
| 2006/0179238 A1 | 8/2006 | Griswell, Jr. et al. |
| 2006/0179265 A1 | 8/2006 | Flood et al. |
| 2006/0179266 A1 | 8/2006 | Flood et al. |
| 2006/0184711 A1 | 8/2006 | Pettey et al. |
| 2006/0184767 A1 | 8/2006 | Le et al. |
| 2006/0184769 A1 | 8/2006 | Floyd et al. |
| 2006/0184770 A1 | 8/2006 | Bishop et al. |
| 2006/0184946 A1 | 8/2006 | Bishop et al. |
| 2006/0195617 A1 | 8/2006 | Arndt et al. |
| 2006/0195619 A1 | 8/2006 | Arndt et al. |
| 2006/0195634 A1 | 8/2006 | Arndt et al. |
| 2006/0195642 A1 | 8/2006 | Arndt et al. |
| 2006/0195644 A1 | 8/2006 | Arndt et al. |
| 2006/0195663 A1 | 8/2006 | Arndt et al. |
| 2006/0195673 A1 | 8/2006 | Arndt et al. |
| 2006/0195675 A1 | 8/2006 | Arndt et al. |
| 2006/0195848 A1 | 8/2006 | Arndt et al. |
| 2006/0206655 A1 | 9/2006 | Chappell et al. |
| 2006/0206936 A1 | 9/2006 | Liang et al. |
| 2006/0209863 A1 | 9/2006 | Arndt et al. |
| 2006/0212608 A1 | 9/2006 | Arndt et al. |
| 2006/0212620 A1 | 9/2006 | Arndt et al. |
| 2006/0212870 A1 | 9/2006 | Arndt et al. |
| 2006/0224790 A1 | 10/2006 | Arndt et al. |
| 2006/0230181 A1 | 10/2006 | Riley |
| 2006/0230217 A1 | 10/2006 | Moll |
| 2006/0239287 A1 | 10/2006 | Johnsen et al. |
| 2006/0242333 A1 | 10/2006 | Johnsen et al. |
| 2006/0242352 A1 | 10/2006 | Torudbakken et al. |
| 2006/0242354 A1 | 10/2006 | Johnsen et al. |
| 2006/0253619 A1 | 11/2006 | Torudbakken et al. |
| 2006/0271820 A1 | 11/2006 | Mack et al. |
| 2007/0019637 A1 | 1/2007 | Boyd et al. |
| 2007/0027952 A1 | 2/2007 | Boyd et al. |
| 2007/0097871 A1 | 5/2007 | Boyd et al. |
| 2007/0097949 A1 | 5/2007 | Boyd et al. |
| 2007/0097950 A1 | 5/2007 | Boyd et al. |
| 2007/0101016 A1 | 5/2007 | Boyd et al. |
| 2007/0136458 A1 | 6/2007 | Boyd et al. |
| 2007/0165596 A1 | 7/2007 | Boyd et al. |
| 2007/0174733 A1 | 7/2007 | Boyd et al. |
| 2007/0186025 A1 | 8/2007 | Boyd et al. |

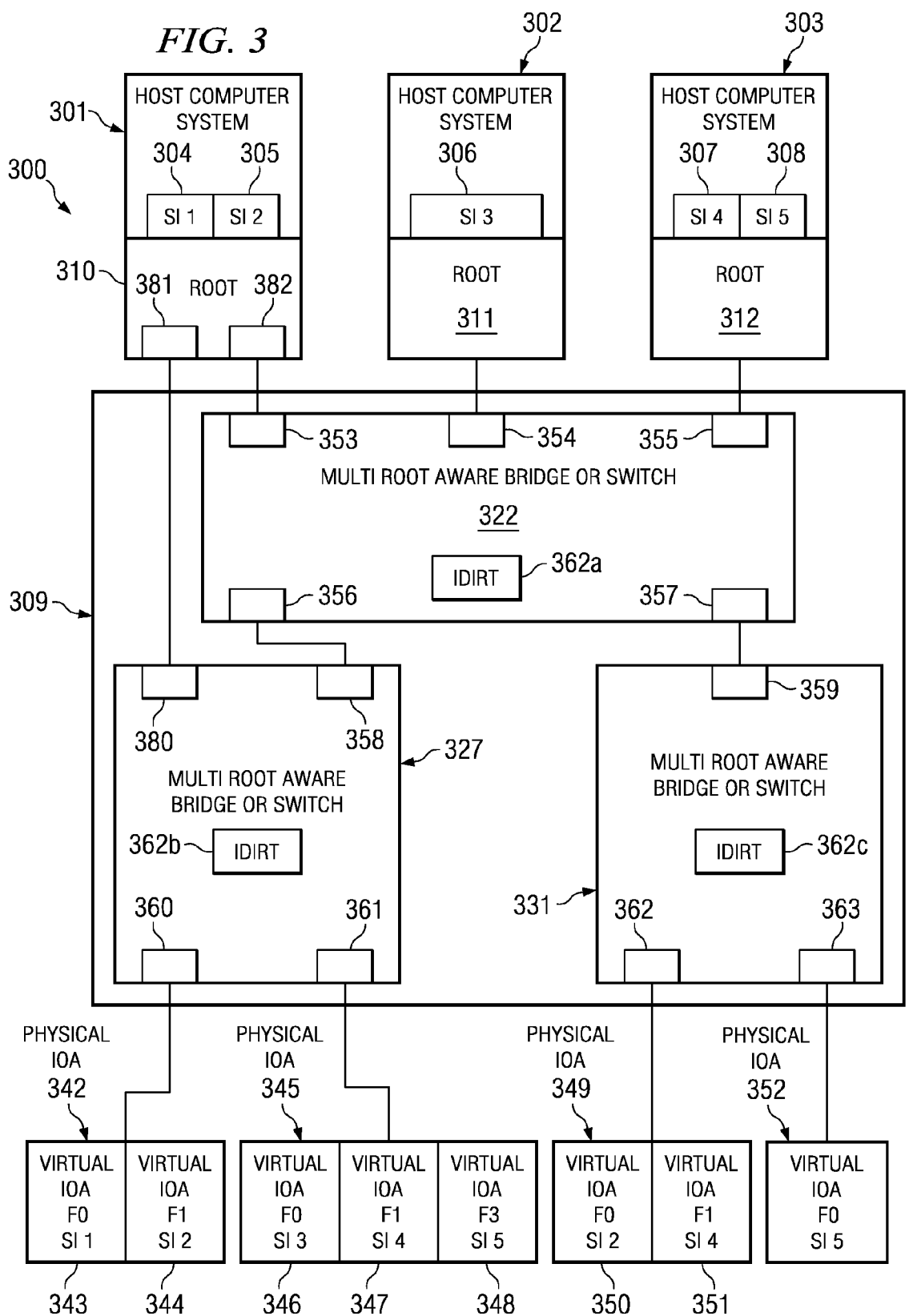

ROUTING TABLE 500

| INTEGRATED DID | ASSOCIATED PORT(S) |
|---|---|
| 0000 | 353 |
| 0001 | 354 |
| 0002 | 355 |

502 → 0000 row
504 → 0001 row
506 → 0002 row

FIG. 5A

ROUTING TABLE 520

| INTEGRATED DID | ASSOCIATED PORT(S) |
|---|---|
| 0000 | 380, 358 |
| 0001 | 358 |
| 0002 | 358 |

522 → 0000 row
524 → 0001 row
526 → 0002 row

FIG. 5B

VALIDATION TABLE 600

| INTEGRATED DID | PERMITTED BDF |
|---|---|
| 0000 | BDF# FOR 343 AND BDF# FOR 344 |
| 0001 | BDF# FOR 346 |
| 0002 | BDF# FOR 347 AND BDF# FOR 348 |

602 → 0000 row
604 → 0001 row
606 → 0002 row

FIG. 6

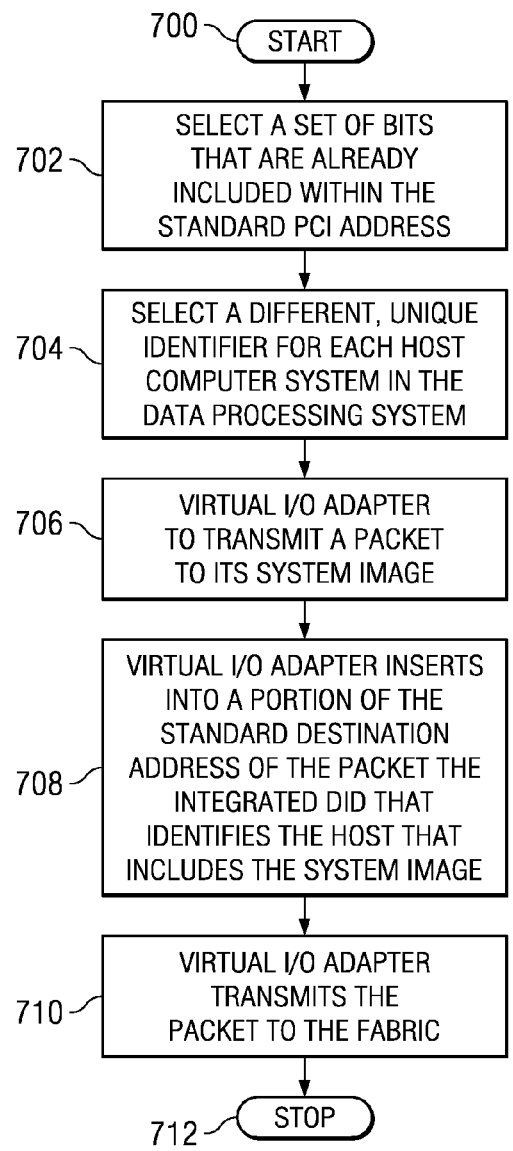

FIG. 7

700 START
702 SELECT A SET OF BITS THAT ARE ALREADY INCLUDED WITHIN THE STANDARD PCI ADDRESS
704 SELECT A DIFFERENT, UNIQUE IDENTIFIER FOR EACH HOST COMPUTER SYSTEM IN THE DATA PROCESSING SYSTEM
706 VIRTUAL I/O ADAPTER TO TRANSMIT A PACKET TO ITS SYSTEM IMAGE
708 VIRTUAL I/O ADAPTER INSERTS INTO A PORTION OF THE STANDARD DESTINATION ADDRESS OF THE PACKET THE INTEGRATED DID THAT IDENTIFIES THE HOST THAT INCLUDES THE SYSTEM IMAGE
710 VIRTUAL I/O ADAPTER TRANSMITS THE PACKET TO THE FABRIC
712 STOP

METHOD, APPARATUS, AND COMPUTER PROGRAM PRODUCT FOR ROUTING PACKETS UTILIZING A UNIQUE IDENTIFIER, INCLUDED WITHIN A STANDARD ADDRESS, THAT IDENTIFIES THE DESTINATION HOST COMPUTER SYSTEM

This application is a continuation of application Ser. No. 11/348,903 filed Feb. 7, 2006, status allowed.

BACKGROUND OF THE INVENTION

1. Field of the Invention

The present invention relates generally to data processing systems and more particularly to a method, apparatus, and computer program product for routing communication packets among multiple host computer systems and adapters through a PCI Express (PCIe) switched-fabric bus. Still more specifically, the illustrative embodiment of the present invention relates to a method, apparatus, and computer program product for routing packets among host computer systems and adapters through a PCIe switched-fabric environment utilizing a unique identifier that is included as part of the standard address where the identifier uniquely identifies a particular host computer system that is to receive the packet.

2. Description of the Related Art

A conventional PCI bus is a local parallel bus that permits expansion cards to be installed within a single computer system, such as a personal computer. PCI-compliant adapter cards can then be coupled to the PCI bus in order to add input/output (I/O) devices, such as disk drives or other devices, to the computer system. A PCI bridge/controller is needed in order to connect the PCI bus to the system bus of the computer system. The PCI bus can communicate, through the PCI bridge/controller, with the CPU of the computer system in which the PCI bus is installed. Several PCI bridges may exist within a single computer system. However, these PCI bridges serve to couple multiple PCI buses to the CPU of the computer system in which the PCI buses are installed. If the single computer system includes multiple CPUs, the PCI buses can be utilized by the multiple CPUs of the single computer system.

A PCI Express (PCIe) bus is a modification of the standard PCI Computer bus. PCIe is based on higher speed serial communications. PCIe is also architected specifically with a tree structured I/O interconnect topology with a Root Complex (RC) denoting the root of an I/O hierarchy that connects a host computer system subsystem to the I/O.

PCIe provides a migration path compatible with the PCI software environment. In addition to offering superior bandwidth, performance, and scalability in both bus width and bus frequency, PCI Express offers other advanced features. These features include QoS (quality of service), aggressive power management, native hot-plug, bandwidth per pin efficiency, error reporting, recovery and correction and innovative form factors, and meet the growing demands for sophisticated capabilities such as peer-to-peer transfers and dynamic reconfiguration. PCI Express also enables low-cost design of products via low pin counts and wires. A linearly scaled 16-lane PCI Express interconnect can provide data transfer rates of more than 8 Gigabytes per second.

The host computer system typically has a PCI-to-Host bridging function commonly known as the root complex. The root complex bridges between a CPU bus, such as hyper-transport, and the PCI bus. Other functions may be performed in the root complex like address translation, if necessary.

Multiple host computer systems containing one or more root functions are referred to as a multi-root system. Multi-root configurations which share I/O fabrics have not been addressed well in the past.

Today, PCIe does not permit the sharing of PCI-compliant I/O adapters among multiple host computer systems. Known I/O adapters that comply with the PCIe standard or a secondary network standard, such as Fibre Channel, InfiniBand, or Ethernet, are typically integrated into blades. Server computer systems are dedicated to the blade or system in which they are integrated. Having dedicated adapters adds to the cost of each system because an adapter is rather expensive. Further, the inability to share an adapter among various host computer systems has contributed to the slow adoption rate of these technologies.

In addition to the cost issue, there are physical space concerns in a blade system. There is a constraint in space that is available in a blade for adapters.

Therefore, a need exists for a method, apparatus, and computer program product for routing packets among host computer systems and adapters through a PCIe switched-fabric environment utilizing a unique identifier that is included as part of the standard address where the identifier uniquely identifies a particular host computer system that is to receive the packet.

SUMMARY OF THE INVENTION

A computer-implemented method, apparatus, and computer program product are disclosed in a data processing environment that includes host computer systems that are coupled to adapters utilizing a switched fabric for routing packets between the host computer systems and the adapters. A unique destination identifier is assigned to one of the host computer systems. A portion of a standard format packet destination address is selected. Within a particular packet, the portion is set equal to the unique identifier that is assigned to the host computer system. The particular packet is then routed through the fabric to the host computer system using the unique destination identifier.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 illustrates a data processing system that includes the present invention in which multiple host computer systems are coupled to adapters, such as I/O adapters, utilizing a fabric of PCI switches in accordance with an illustrative embodiment of the present invention;

FIG. 5A illustrates a routing table that is stored in a first PCI bridge/switch in the fabric in accordance with an illustrative embodiment of the present invention;

FIG. 5B illustrates a routing table that is stored in a second PCI bridge/switch in the fabric in accordance with an illustrative embodiment of the present invention;

FIG. 6 illustrates a validation table in accordance with an illustrative embodiment of the present invention;

FIG. 7 depicts a high level flow chart that illustrates selecting a unique identifier for each host in the data processing system in accordance with an illustrative embodiment of the present invention.

DETAILED DESCRIPTION OF THE PREFERRED EMBODIMENT

Figure 1:
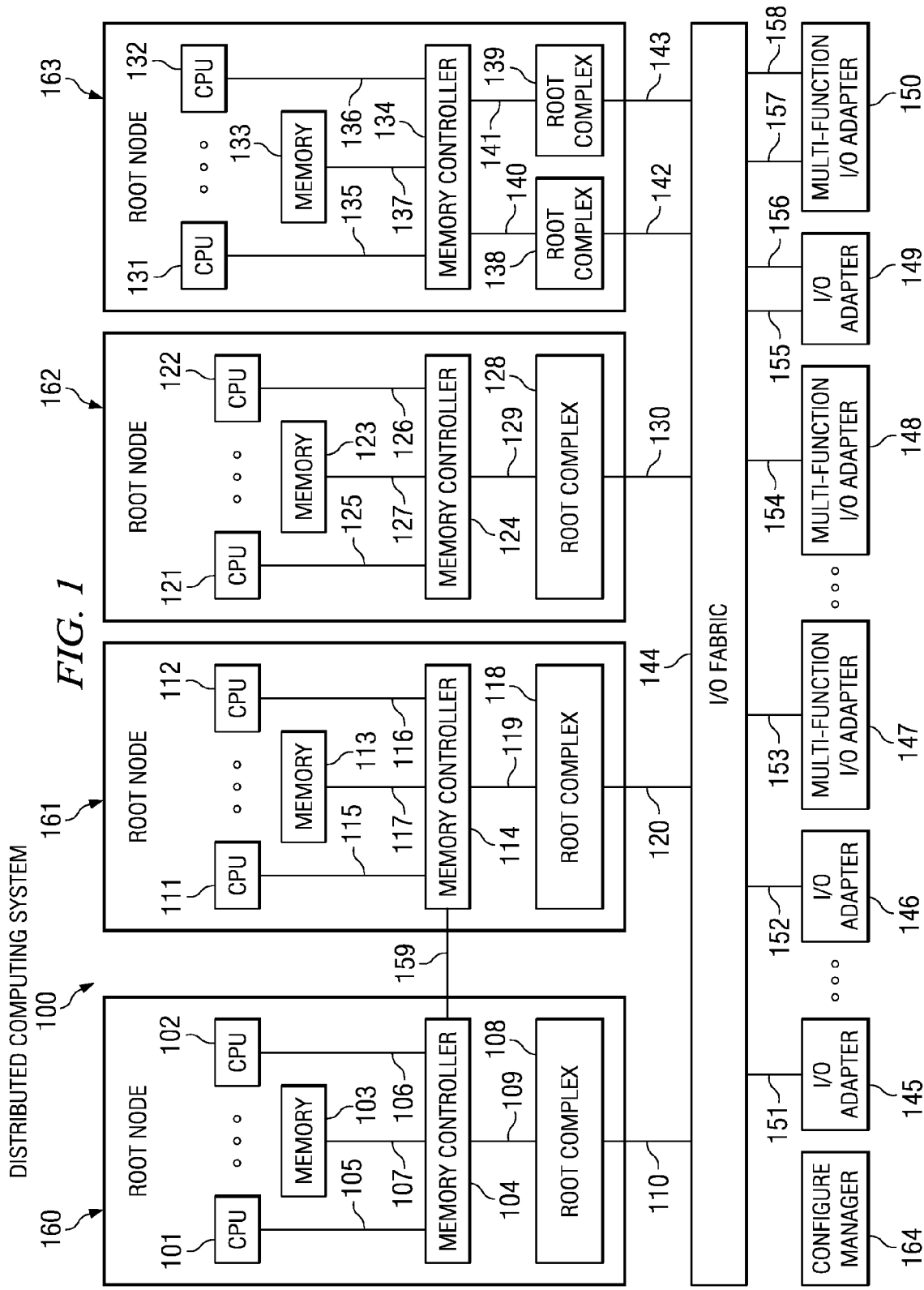
FIG. 1 is a diagram of a distributed computer system illustrated in accordance with an illustrative embodiment of the present invention.

The illustrative embodiment of the present invention applies to any general or special purpose computing system where multiple host computer systems share a pool of I/O adapters (IOAs) through a common I/O fabric. In an illustrative embodiment, the fabric is a collection of devices that conform to the PCI Express standard.

In the illustrative embodiment of the present invention, the PCI Express I/O fabric is attached to more than one host computer system and to more than one I/O adapter such that the multiple different host computer systems can share the I/O adapters with other host computer systems. A physical adapter may be virtualized such that the physical adapter is logically allocated to one or more host computer systems. Each virtual adapter appears to its host computer system as a separate and independent physical adapter. In this manner, a physical adapter that is logically divided into multiple virtual adapters can act as if it were several different and independent physical adapters.

Each virtual adapter may be assigned to a different host computer system. For example, a particular physical adapter may be logically divided into three virtual adapters. Each one of these virtual adapters may be assigned to the same or different host computer systems. Within each host computer system there can exist multiple different logical partitions, also called system images, running the same or different operating systems.

In order to allow virtualization and sharing of PCI I/O adapters in an environment where multiple host computer systems communicate with multiple adapters through a PCI switched-fabric bus, a mechanism is needed that can route packets from a virtual I/O adapter to a particular system image within a particular host computer system that also protects one system image's memory and data from being accessed by virtual I/O adapters that are not allocated to that particular system image.

The illustrative embodiment is an address routing mechanism that will enable a PCI network fabric to support the attachment of multiple host computer systems and share virtual PCI I/O adapters among those hosts. According to the illustrative embodiment, part of the standard destination address that conforms to the PCIe standard, currently used as a destination address for routing a packet, is used as a unique identifier. This unique identifier is referred to herein as an integrated destination identifier (DID).

A unique integrated DID is assigned to each host computer system. When a virtual I/O adapter transmits a packet to a host, the packet can be routed through a PCI bridge/switch using only the integrated DID.

By using a portion of the existing PCIe standard address, the packets will still conform to the PCIe standard. PCIe transaction changes are not needed. Further, an error checking code, such as a CRC can be calculated for the packet when the packet is transmitted from the virtual adapter. This CRC will not need to be recalculated as the packet traverses through the fabric.

With reference now to the figures and in particular with reference to FIG. 1, a diagram of a distributed computing system 100 is illustrated in accordance with an illustrative embodiment of the present invention. The distributed computer system represented in FIG. 1 takes the form of two or more root complexes (RCs) 108, 118, 128, 138, and 139, attached to an I/O fabric 144 through I/O links 110, 120, 130, 142, and 143, and to the memory controllers 104, 114, 124, and 134 of the root nodes (RNs) 160-163.

A root complex is included within a root node. The host computer system typically has a PCI-to-Host bridging function commonly known as the root complex. The root complex bridges between a CPU bus such as hyper-transport and the PCI bus. Other functions may be performed in the root complex like address translation, if necessary. Multiple hosts containing one or more root complex functions are referred to as a multi-root system. A root node is a complete computer system, such as a server computer system. A root node is also referred to herein as a host node.

The I/O fabric is attached to the IOAs 145-150 through links 151-158. The IOAs may be single function IOAs as in 145-146 and 149, or multiple function IOAs as in 147-148 and 150. Further, the IOAs may be connected to the I/O fabric via single links as in 145-148 or with multiple links for redundancy as in 149-150.

The RCs 108, 118, 128, 138, and 139 are part of an RN 160-163. There may be more than one RC per RN as in RN 163. In addition to the RCs, each RN consists of one or more Central Processing Units (CPUs) 101-102, 111-112, 121-122, 131-132, memory 103, 113, 123, and 133, a memory controller 104, 114, 124, and 134 which connects the CPUs, memory, and I/O RCs and performs such functions as handling the coherency traffic for the memory.

RNs may be connected together 159 at their memory controllers to form one coherency domain and which may act as a single Symmetric Multi-Processing (SMP) system, or may be independent nodes with separate coherency domains as in RNs 162-163.

Configuration manager 164 is also referred to herein as a PCI manager. PCI manager 164 may be attached separately to the I/O fabric 144 or may be part of one of the RNs 160-163. The configuration manager configures the shared resources of the I/O fabric and assigns resources to the RNs.

Distributed computing system 100 may be implemented using various commercially available computer systems. For example, distributed computing system 100 may be implemented using an IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
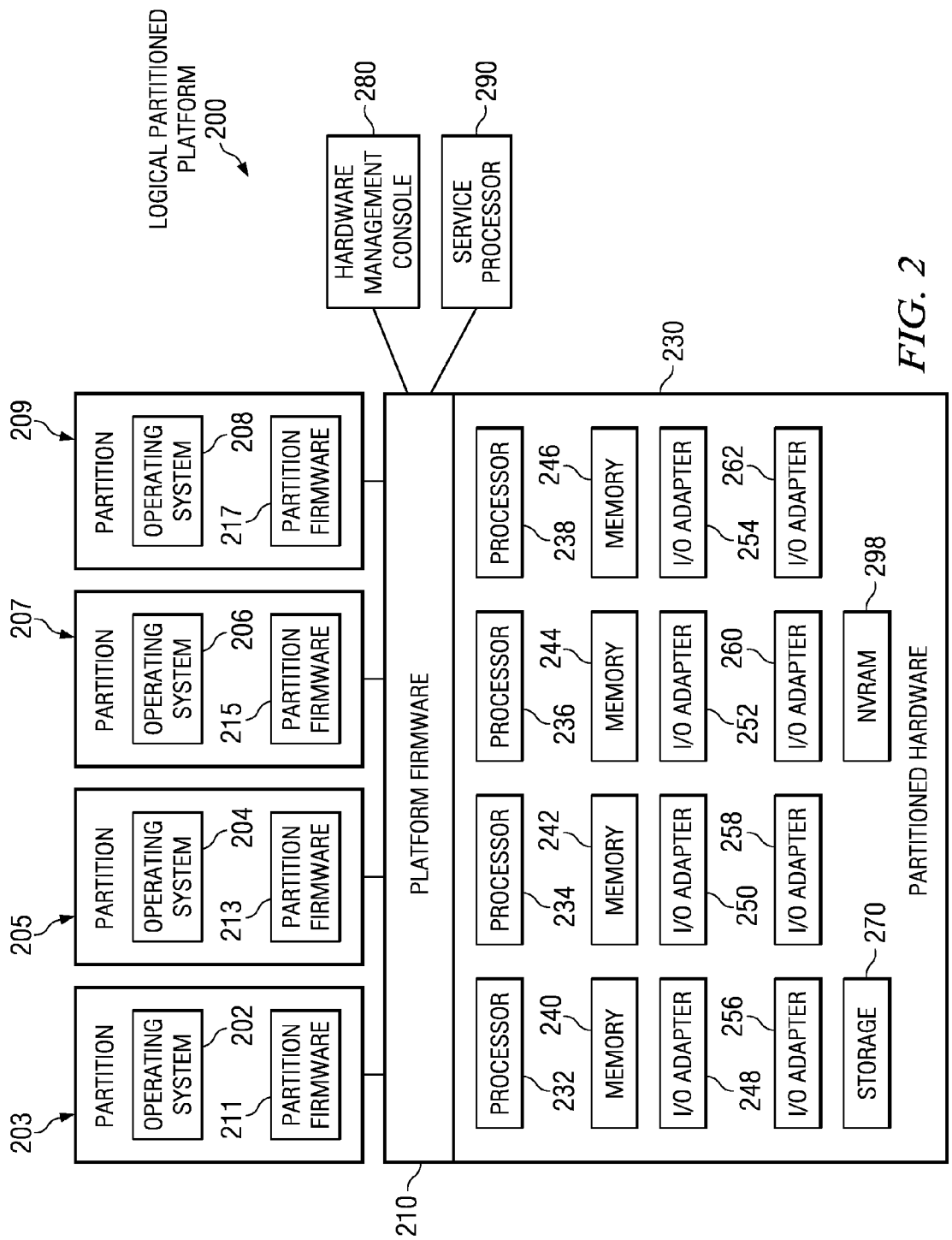
FIG. 2 is a block diagram of a logically partitioned platform that includes the illustrative embodiment of the present invention.

With reference now to FIG. 2, a block diagram of an exemplary logically partitioned platform is depicted in which the present invention may be implemented. The hardware in logically partitioned platform 200 may be implemented as, for example, distributed computing system 100 in FIG. 1. Logically partitioned platform 200 includes partitioned hardware 230, operating systems 202, 204, 206, 208, and partition management firmware 210.

Operating systems 202, 204, 206, and 208 may be multiple copies of a single operating system or multiple heterogeneous operating systems simultaneously run on logically partitioned platform 200. These operating systems may be implemented using OS/400, which are designed to interface with a partition management firmware, such as Hypervisor. OS/400 is used only as an example in these illustrative embodiments. Other types of operating systems, such as AIX and Linux, may also be used depending on the particular implementation.

Operating systems 202, 204, 206, and 208 are located in partitions 203, 205, 207, and 209. Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation.

When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes a plurality of processors 232-238, a plurality of system memory units 240-246, a plurality of IOAs 248-262, an NVRAM storage 298, and a storage unit 270. Each of the processors 232-238, memory units 240-246, NVRAM storage 298, and IOAs 248-262, or parts thereof, may be partitioned to one of multiple partitions within logical partitioned platform 200 by being assigned to one of the partitions, each of the partitioned resources then corresponding to one of operating systems 202, 204, 206, and 208.

Partition management firmware 210 performs a number of functions and services for partitions 203, 205, 207, and 209 to create and enforce the partitioning of logically partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate distributed computing system from which a system administrator may perform various functions including reallocation of resources to different partitions.

In a logically partitioned (LPAR) environment, it is not permissible for resources or programs in one partition to affect operations in another partition. Furthermore, to be useful, the assignment of resources needs to be fine-grained.

FIG. 3 illustrates a data processing system that includes the present invention in which multiple host computer systems are coupled to adapters, such as I/O adapters, utilizing a fabric of PCI switches in accordance with an illustrative embodiment of the present invention. FIG. 3 depicts a PCI fabric that supports multiple roots through the use of multiple switches.

Data processing system 300 includes a plurality of host computer systems 301-303, each containing a single or plurality of system images (SIs) 304-308. These systems then interface to the I/O fabric 309 through their RCs 310-312. Each of these RCs can have one port, such as RC 311 or 312, or more ports, such as RC 310 which has two ports, such as port 381 and port 382. A host computer system along with the corresponding RC will be referred to as the root node.

Each root node is connected to a root port 353-355 of a multi root aware bridge or switch, such as multi root aware bridge or switch 322 or 327. A multi root aware bridge or switch, by way of this invention, includes the configuration mechanisms that are necessary to discover and configure a multi root PCI fabric.

The ports of a multi root aware bridge or switch, such as 322, 327, and 331, can be used as upstream ports, downstream ports, or upstream and downstream ports, where the definition of upstream and downstream is as described in PCI Express Specifications. In FIG. 3, ports 353, 354, 355, 359, and 380 are upstream ports, ports 357, 360, 361, 362, and 363 are downstream ports, and ports 356 and 358 are upstream/downstream ports.

The ports configured as downstream ports are used to attach adapters or to the upstream port of another switch. In FIG. 3, multi root aware switch 327 uses downstream port 360 to attach I/O Adapter 342, which has two virtual IO adapters, or virtual I/O resources, 343 and 344. Similarly, multi root aware switch 327 uses downstream port 361 to attach I/O Adapter 345, which has three virtual I/O adapters, or virtual IO resources, 346, 347, and 348. Multi root aware switch 322 uses downstream port 357 to attach to port 359 of bridge/switch 331. Multi root aware switch 331 uses downstream ports 362 and 363 to attach IOA 349 and IOA 352 respectively.

The ports configured as upstream ports are used to attach a RC. In FIG. 3, multi root aware switch 327 uses upstream port 380 to attach port 381 of root 310. Similarly, multi root aware switch 322 uses upstream port 353 to attach port 382 of root 310, port 354 to attach a port (not shown) in root 311, and port 355 to attach a port (not shown) in root 312.

The ports configured as upstream/downstream ports are used to attach to the upstream/downstream of another switch. In FIG. 3, multi root aware switch 327 uses upstream/downstream port 358 to attach to upstream/downstream port 356 of multi root aware switch 322.

IOA 342 is shown as a virtualized IOA with its function 0 (F0) 343 assigned and accessible to system image 1 (SI1) 304, and its function 1 (F1) 344 assigned and accessible to system image 2 (ST2) 305.

In a similar manner, IOA 345 is shown as a virtualized IOA with its function 0 (F0) 346 assigned and accessible to system image 3 (SI3) 306, its function 1 (F1) 347 assigned and accessible to system image 4 (SI4) 307, and its function 3 (F3) assigned to system image 5 (SI5) 308.

IOA 349 is shown as a virtualized IOA with its F0 350 assigned and accessible to SI2 305, and its F1 351 assigned and accessible to SI4 307.

IOA 352 is shown as a single function IOA assigned and accessible to SI5 308.

When a virtual I/O adapter (IOA) is assigned to a particular system image (SI), that virtual IOA has been associated with (i.e. partitioned to) that particular SI. Once a virtual IOA has been partitioned to a particular SI, the virtual IOA is logically dedicated to the particular SI and cannot be accessed by any other system image.

The illustrative embodiment of the present invention provides a method, apparatus, and computer program product for efficiently routing packets from a virtual IOA to the particular SI to which it is partitioned. The virtual IOA inserts, into a PCIe packet sent by the virtual IOA, the integrated DID that identifies the host which includes the particular SI. The integrated DID is inserted into a portion of the standard destination address. The virtual IOA transmits the packet. The packet is then routed through the fabric to the host using only the integrated DID.

Each switch/bridge includes an integrated DID routing table (IDIRT) that associates a particular integrated DID with one or more ports of the switch/bridge. When a switch/bridge receives a packet, that switch/bridge determines which integrated DID is included in the portion of the standard destination address of the packet. The switch/bridge uses its IDIRT to determine which port is associated with the particular DID that is stored in the packet. The switch/bridge then transmits the packet out of that port.

The illustrative embodiment of the present invention also provides a method, apparatus, and computer program product for further enforcing the partitioning of virtual adapters to system images. Each switch/bridge may include a validation table. A validation table associates an integrated DID with one or more virtual BDFs. For example, for upstream communications a host integrated DID is associated with the BDF number of each virtual IOA that is allowed to communicate with that host. For upstream communications, this association is accomplished by including an entry in the table for an integrated DID that identifies all valid virtual IOAs for that integrated DID. If a particular virtual IOA is listed in the entry for an integrated DID, that particular virtual IOA is then valid for the integrated DID.

Similarly, for downstream communications a virtual IOA integrated DID is associated with the host BDF number that is allowed to communicate with that virtual IOA.

When the switch/bridge receives a packet from a particular virtual IOA, the switch/bridge determines the integrated DID that is included in the packet as described above. The switch/bridge then uses its validation table to determine whether the virtual IOA that sent the packet is partitioned to a system image that is included in the host that is identified by the integrated DID. Thus, a determination is made as to whether the virtual IOA that sent this packet is partitioned to the host to which the virtual IOA is sending the packet.

This determination is made by examining the entry in the table that includes the integrated DID. If the entry lists the sending virtual IOA, a determination is made that the virtual IOA is partitioned to the host and the switch/bridge will transmit the packet. If the entry does not list the sending virtual IOA, a determination is made that the virtual IOA is not partitioned to the host and the switch/bridge will drop the packet and not transmit it. The switch may also surface an error indicating that an invalid access attempt occurred to the fabric manager.

FIG. 3 also shows a conceptual view of where the mechanisms for integrated DID based routing would reside in the illustrative embodiment of this invention. Other components within the configuration could also store whole or parts of integrated DID routing tables without departing from the essence of this invention. Integrated DID Routing mechanisms 362*a*, 362*b* and 362*c* are shown to be located in the bridges or switches 327, 322, and 331 respectively, These mechanisms will consist of tables and associations that will be further described in the following figures.

The routing of the I/O transactions from System Images to Adapters and vice versa are routed using the integrated Destination ID field as follows: the switch uses the integrated DID to look-up an egress switch port (through association of the integrated DID to switch port in the IDIRT) and transfers the unchanged packet through the egress switch port. Each end-end association has a PCI address range associated with a given DID.

Figure 4A:
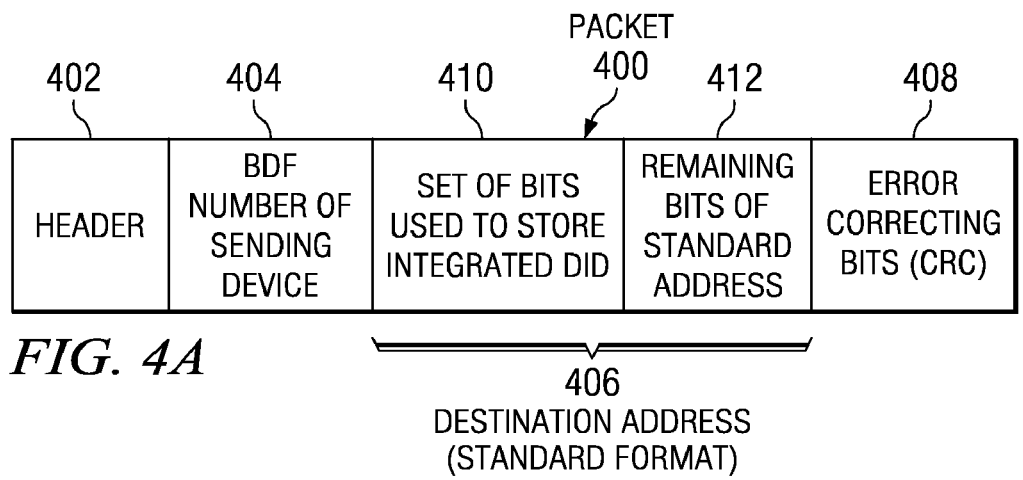
FIG. 4A is a block diagram that depicts a communications packet in accordance with an illustrative embodiment of the present invention.

FIG. 4A is a block diagram that depicts a communications packet in accordance with an illustrative embodiment of the present invention. Communications packet 400 preferably conforms to the PCI Express (PCIe) standard. Packet 400 is used by an I/O adapter when that adapter is transmitting information to one of the host computer systems in the data processing system. Packet 400 includes a header 402, a BDF number 404 of the device that sent this packet, a destination address 406 that conforms to the PCIe standard, and error correcting bits 408. The error correcting bits can be a CRC or any other error correcting code.

According to the illustrative embodiment, a portion of the destination address that is in the standard format is replaced with a particular unique identifier. This portion of the standard destination address includes the set of bits 410 selected to use to store the integrated DID. This unique identifier is referred to herein as an integrated destination identifier (DID). A different, unique integrated DID is specified for each host computer system in the data processing system. Thus, a particular host can he identified by looking at the integrated DID that is stored in the set of bits 410 in a packet. The remaining bits 412 of the standard destination address 406 are then used to identify a particular destination within the host.

Because the present invention describes altering the standard destination address to include a unique DID that specifies a particular host, the CRC 408 that is calculated for the packet remains the same and unaltered as the packet traverses through the fabric.

In this manner, each host is granted its own address space that is a portion of the total address space. Similarly, each virtual IC adapter is also granted its own address space. For example, referring to FIG. 3, roots 310, 311, and 312 each have their own unique address spaces. Similarly, each Virtual IOA, such as Virtual IOA 343 and 344, is also granted its own address space.

Figure 4B:
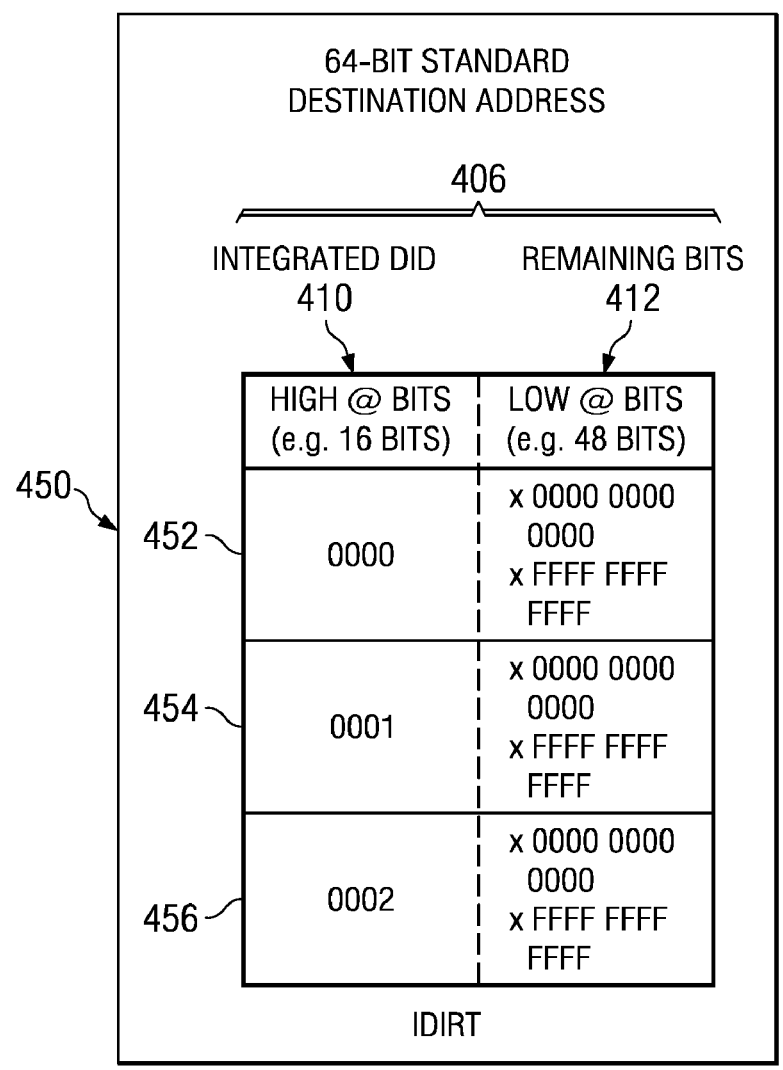
FIG. 4B illustrates an Integrated Destination Identifier Routing Table (IDIRT) within which the unique identifiers, i.e. integrated DIDs, are defined for each host computer system in accordance with an illustrative embodiment of the present invention.

FIG. 4B illustrates an integrated destination identifier routing table (IDIRT) within which the unique identifiers, i.e. integrated DIDs, are defined for each host computer system in accordance with an illustrative embodiment of the present invention. IDIRT 450 includes an entry for each host. Since the depicted exemplary data processing system 300 includes three host computer systems, IDIRT 450 includes three entries. Entry 452 is associated with host 301. Entry 454 is associated with host 302. Entry 456 is associated with host 456.

The standard destination address is a 64-bit address according to the PCIe standard. In the example depicted in FIG. 4B, the set of bits 410 that has been selected to be used to store an integrated DID include the upper 16 bits. The remaining lower 48 bits are the remaining bits 412. In the depicted example, host 301 has been assigned an integrated DID of 0000. Host 302 has been assigned an integrated DID of 0001. Host 303 has been assigned an integrated DID of 0002.

The remaining bits are then used to address x0000 0000 0000 through address xFFFF FFFF FFFF within the particular address space that is granted to a particular host.

FIG. 5A illustrates a routing table that is stored in a first PCI bridge/switch in the fabric in accordance with an illustrative embodiment of the present invention. Each PCI bridge/switch in fabric 309 that is multi-root aware will preferably include its own routing table that has been configured for that particular PCI bridge/switch. In this example, routing table 500 is stored in PCI bridge/switch 322 as IDIRT 362a. Routing table 500 includes an entry for each host. Entry 502 is associated with host 301 since it includes that host's integrated DID, which is 0000. When switch 322 receives a packet that includes an integrated DID of 0000, it will send that packet out port 353 as indicated by entry 502.

Entry 504 is associated with host 302 since it includes that host's integrated DID which is 0001. When switch 322 receives a packet that includes an integrated DID of 0001, it will send that packet out port 354 as indicated by entry 504.

Entry 506 is associated with host 303 since it includes that host's integrated DID which is 0002. When switch 322 receives a packet that includes an integrated DID of 0002, it will send that packet out port 355 as indicated by entry 506.

FIG. 5B illustrates a routing table that is stored in a second PCI bridge/switch in the fabric in accordance with an illustrative embodiment of the present invention. In this example, routing table 520 is stored in PCI bridge/switch 327 as IDIRT 362b.

Routing table 520 includes an entry for each host. Entry 522 is associated with host 301 since it includes that host's integrated DID which is 0000. When switch 327 receives a packet that includes an integrated DID of 0000, it will send that packet out either port 380 or 358 as indicated by entry 522. Switch 327 can select either one of these ports since host 301 can be reached through either one of these ports.

Entry 524 is associated with host 302 since it includes that host's integrated DID which is 0001. When switch 327 receives a packet that includes an integrated DID of 0001, it will send that packet out port 358 as indicated by entry 524.

Entry 526 is associated with host 303 since it includes that host's integrated DID which is 0002. When switch 327 receives a packet that includes an integrated DID of 0002, it will send that packet out port 358 as indicated by entry 526.

FIG. 6 illustrates an upstream validation table in accordance with an illustrative embodiment of the present invention. The mechanism described in the present invention can be used for downstream validation, in which case the validation table contains one entry for each virtual IOA integrated DID with the host BDF that can communicate with the virtual IOA associated with the entry.

Each PCI bridge/switch in fabric 309 that is multi-root aware will preferably include its own upstream validation table that has been configured for that particular PCI bridge/ switch. An upstream validation table that is included within a particular PCI bridge/switch will include an entry for each host that can be accessed by the particular PCI bridge/switch and also will include all permitted I/O adapter devices that are coupled to the particular PCI switch/bridge, either directly or indirectly, that are permitted to access that host. The permitted I/O adapter devices may be either physical adapters or virtual adapters. The permitted I/O adapter devices are identified using their bus/device/function (BDF) numbers. Each BDF number uniquely identifies a particular virtual IOA.

The depicted upstream validation table is an example of the upstream validation table that would be included in switch 327. Upstream validation table 600 includes an entry for each host that can be accessed by switch 327. Thus, validation table 600 includes an entry 602 associated with host 301, an entry 604 associated with host 302, and an entry 606 associated with host 303.

Host 301 can be accessed by virtual I/O adapter 343 and virtual I/O adapter 344 through switch 327. Thus, entry 602 includes the BDF number for virtual adapter 343 that indicates I/O adapter 343, which is written as "BDF# for 343" in the table, and the BDF number for virtual adapter 344 that indicates I/O adapter 344, which is written as "BDF# for 344" in the table.

Host 302 can be accessed by virtual I/O adapter 346 through switch 327. Thus, entry 604 includes the BDF number for virtual adapter 346 that indicates I/O adapter 346, which is written as "BDF# for 346" in the table.

Host 303 can be accessed by virtual I/O adapter 347 and virtual I/O adapter 348 through switch 327. Thus, entry 606 includes the BDF number for virtual adapter 347 that indicates I/O adapter 347, which is written as "BDF# for 347" in the table, and the BDF number for virtual adapter 348 that indicates I/O adapter 348, which is written as "BDF# for 348" in the table.

FIG. 7 depicts a high level flow chart that illustrates selecting a unique identifier for each host in the data processing system in accordance with an illustrative embodiment of the present invention. The process starts as depicted by block 700 and thereafter passes to block 702 which illustrates selecting a set of bits that are already included within the standard format PCI destination address. Next, block 704 depicts selecting a different, unique identifier for each host computer system in the data processing system.

The process then passes to block 706 which illustrates a virtual I/O adapter needing to transmit a packet to its system image. Block 708, then, depicts the virtual I/O adapter inserting, into a portion of the standard destination address of the packet, the integrated DID that identifies the host that includes the virtual I/O adapter's system image. Next, block 710 illustrates the virtual I/O adapter transmitting the packet to the fabric. The process then terminates as depicted by block 712.

Figure 8:
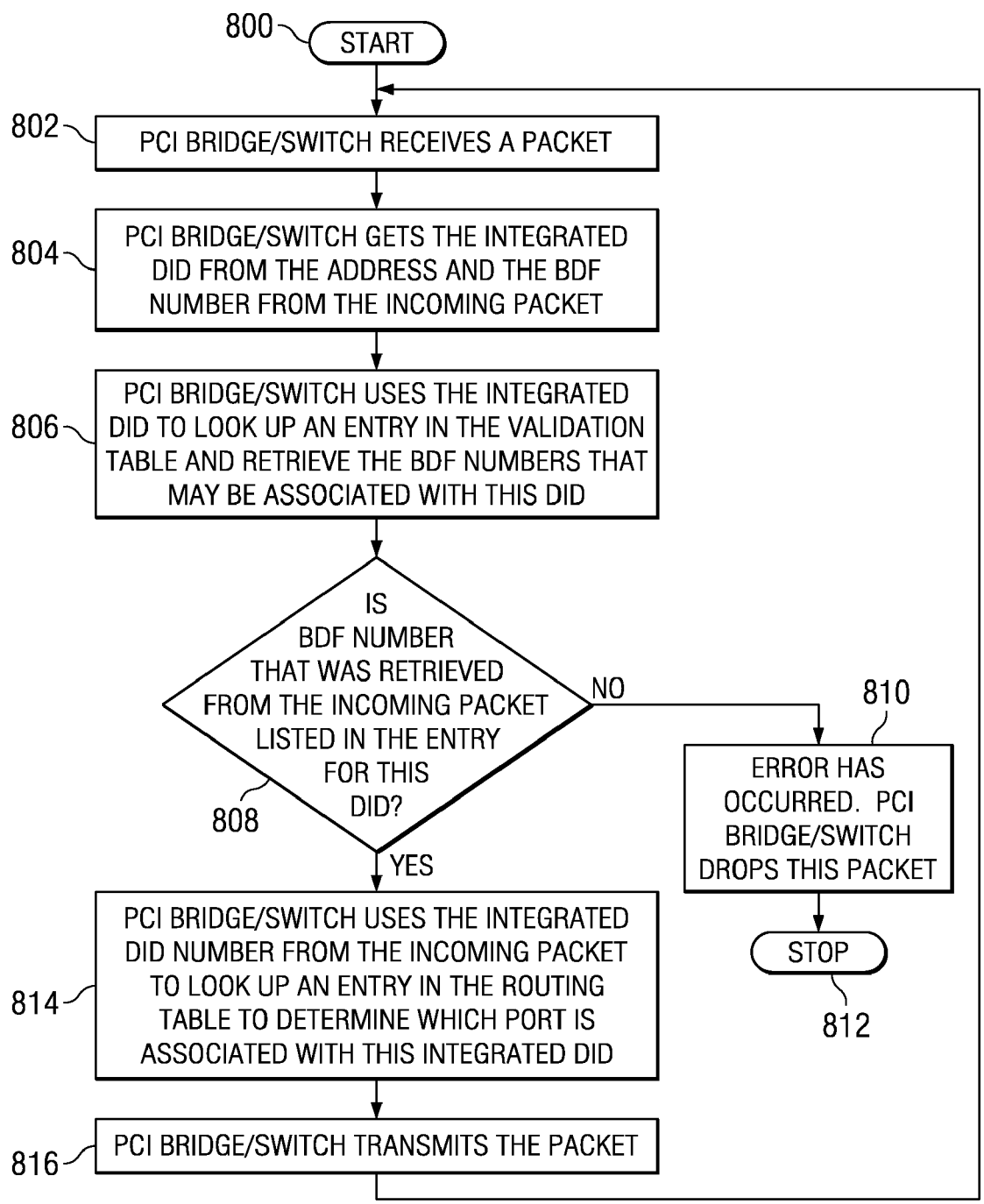
FIG. 8 depicts a high level flow chart that illustrates using a host's unique identifier that is integrated as part of the standard address to route a packet in accordance with an illustrative embodiment of the present invention.

FIG. 8 depicts a high level flow chart that illustrates using a host's unique identifier that is integrated as part of the standard address to route a packet in accordance with the present invention. The process starts as depicted by block 800 and thereafter passes to block 802 which illustrates a PCI bridge/switch receiving a packet. Next, block 804 depicts the PCI bridge/switch getting from the incoming packet the integrated DID from the standard destination address and getting from the packet the BDF number. Next, block 806 illustrates the PCI switch using the integrated DID to look up an entry in this switch's validation table and retrieve the BDF number from that table that is associated with the integrated DID that was retrieved from the packet.

Thereafter, block 808 depicts a determination, made using this switch's validation table, of whether or not the BDF number that was retrieved from the incoming packet is listed in the entry for the integrated DID that was also retrieved from the incoming packet. If a determination is made that the BDF number is not listed for the integrated DID that was retrieved from the incoming packet, the process passes to block 810 which illustrates the occurrence of an error. Thus, the PCI switch will drop this packet. The process then terminates as depicted by block 812.

Referring again to block 808, if a determination is made that the BDF number is listed for the integrated DID that was retrieved from the incoming packet, the process passes to block 814 which illustrates the PCI switch using the integrated DID number from the incoming packet to look up an entry in this switch's routing table to determine which port is associated with this integrated DID. Block 816, then, depicts the PCI switch transmitting the packet from the port determined from the routing table. The process then passes back to block 802.

The invention can take the form of an entirely hardware embodiment, an entirely software embodiment or an embodiment containing both hardware and software elements. In an illustrative embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An apparatus in a data processing environment that includes a plurality of host computer systems that are coupled to a plurality of adapters utilizing a switched fabric for routing packets between said plurality of host computer systems and said plurality of adapters, said apparatus comprising:
   a unique destination identifier that is assigned to one of said plurality of host computer systems;
   a portion of a standard format packet destination address;
   a particular packet that includes a portion that is set equal to said unique destination identifier that is assigned to said one of said plurality of host computer systems;
   a validation table stored in a switch in said switched fabric, wherein the validation table associates said unique destination identifier with a bus/device/function number for at least one of said plurality of adapters; and
   said unique destination identifier for routing said particular packet through said switched fabric to said one of said plurality of host computer systems.

2. The apparatus according to claim 1, further comprising:
   said standard format packet destination address conforming to a peripheral component interconnect express standard.

3. The apparatus according to claim 1, further comprising:
   said particular packet conforming to a peripheral component interconnect express standard.

4. The apparatus according to claim 1, further comprising:
   said standard format packet destination address including a plurality of bits, said plurality of bits including a first plurality of bits and a second plurality of bits; and
   said first plurality of bits being said portion.

5. The apparatus according to claim 1, further comprising:
   a routing table included in said switch in said fabric, said switch including a plurality of ports;
   a unique destination identifier that is associated with each one of said plurality of host computer systems to form a plurality of unique destination identifiers;
   said routing table for storing said plurality of unique destination identifiers for said plurality of host computer systems; and
   at least one of said plurality of ports being associated with each one of said plurality of unique destination identifiers.

6. The apparatus according to claim 5, further comprising:
   said switch for receiving said particular packet;
   said switch determining from said portion a particular unique destination identifier that is stored in said portion;
   said routing table for determining at least one particular port that is associated with said particular unique destination identifier; and
   said particular packet being routed by transmitting said particular packet from said at least one particular port.

7. The apparatus according to claim 1, further comprising:
   a unique destination identifier that is associated with each one of said plurality of host computer systems to form a plurality of unique destination identifiers;
   said plurality of unique destination identifiers for said plurality of host computer systems stored in said validation table; and
   at least one of said plurality of adapters being associated with each one of said plurality of unique destination identifiers.

8. The apparatus according to claim 7, further comprising:

said switch for receiving said particular packet;

said switch for determining from said portion a particular unique destination identifier that is stored in said portion;

said validation table for determining said at least one of said plurality of adapters that are associated with said particular unique destination identifier;

said switch for determining an identity of one of said plurality of adapters that transmitted said particular packet;

in response to said one of said plurality of adapters that transmitted said particular packet being said at least one of said plurality of adapters that are associated with said particular unique destination identifier, said switch transmitting said particular packet; and in response to said one of said plurality of adapters that transmitted said particular packet not being said at least one of said plurality of adapters that are associated with said particular unique destination identifier, said switch dropping said particular packet wherein said particular packet is not transmitted from said switch.

9. A computer program product comprising:

a computer usable medium including computer usable program code, in a data processing environment that includes a plurality of host computer systems that are coupled to a plurality of adapters utilizing a switched fabric, for routing packets between said plurality of host computer systems and said plurality of adapters, said computer program product comprising:

computer usable program code for assigning a unique destination identifier to one of said plurality of host computer systems;

computer usable program code for selecting a portion of a standard format packet destination address;

computer usable program code for setting, within a particular packet, said portion equal to said unique destination identifier that is assigned to said one of said plurality of host computer systems;

computer usable program code for storing a validation table in a switch in said switched fabric, wherein the validation table associates said unique identifier with a bus/device/function number for at least one of said plurality of adapters; and computer usable program code for routing said particular packet through said switched fabric to said one of said plurality of host computer systems using said unique destination identifier.

10. The product according to claim 9, further comprising:

said standard format packet destination address including a plurality of bits, said plurality of bits including a first plurality of bits and a second plurality of bits; and computer usable code for specifying said first plurality of bits as said portion.

11. The product according to claim 9, further comprising:

computer usable program code for storing a routing table in said switch in said fabric, said switch including a plurality of ports;

computer usable program code for associating a unique destination identifier with each one of said plurality of host computer systems to form a plurality of unique destination identifiers;

computer usable program code for storing said plurality of unique destination identifiers for said plurality of host computer systems in said routing table; and computer usable program code for associating at least one of said plurality of ports with each one of said plurality of unique destination identifiers.

12. The product according to claim 11, further comprising:

computer usable program code for receiving said particular packet within said switch;

computer usable program code for determining from said portion a particular unique destination identifier that is stored in said portion;

computer usable program code for determining, utilizing said routing table, at least one particular port that is associated with said particular unique destination identifier; and computer usable program code for routing said particular packet by transmitting said particular packet from said at least one particular port.

* * * * *